(12) United States Patent
Inagaki (10) Patent No.: US 8,892,312 B2
(45) Date of Patent: Nov. 18, 2014

(54) SIDE COLLISION DETERMINATION APPARATUS FOR VEHICLE AND HIGH VOLTAGE POWER SUPPLY SHUT-OFF APPARATUS

(75) Inventor: Tomohiro Inagaki, Kariya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 759 days.

(21) Appl. No.: 13/043,126

(22) Filed: Mar. 8, 2011

(65) Prior Publication Data

US 2011/0224869 A1    Sep. 15, 2011

(30) Foreign Application Priority Data

Mar. 9, 2010  (JP) ................................ P2010-051246

(51) Int. Cl.
| | | |
|---|---|---|
| *G06F 19/00* | (2011.01) | |
| *B60R 21/0132* | (2006.01) | |
| *B60L 3/04* | (2006.01) | |
| *B60R 21/00* | (2006.01) | |

(52) U.S. Cl.
CPC .............. *B60R 21/0132* (2013.01); *B60L 3/04* (2013.01); *B60R 2021/0006* (2013.01)
USPC ............. 701/45; 180/274; 180/279; 280/735; 340/436

(58) Field of Classification Search
USPC ............. 701/45; 180/271, 274, 279; 280/734, 280/735; 340/436
See application file for complete search history.

(56) References Cited

U.S. PATENT DOCUMENTS

| | | | | |
|---|---|---|---|---|
| 5,338,062 | A * | 8/1994 | Kiuchi et al. ................. | 280/735 |
| 6,018,980 | A * | 2/2000 | Kimura et al. ............... | 73/12.04 |
| 6,023,664 | A * | 2/2000 | Bennet .......................... | 702/141 |
| 6,917,866 | B2 * | 7/2005 | Grotendiek et al. ............ | 701/45 |
| 7,281,599 | B2 * | 10/2007 | Takeuchi et al. .............. | 180/274 |
| 7,363,997 | B2 * | 4/2008 | Sato et al. .................. | 180/65.31 |

(Continued)

FOREIGN PATENT DOCUMENTS

| | | |
|---|---|---|
| DE | 196 51 123 C1 | 6/1998 |
| DE | 101 14 277 C1 | 10/2002 |

(Continued)

OTHER PUBLICATIONS

European Search Report issued on Feb. 17, 2012.

*Primary Examiner* — Thomas G Black
*Assistant Examiner* — Peter D Nolan
(74) *Attorney, Agent, or Firm* — Birch, Stewart, Kolasch & Birch, LLP (57) ABSTRACT

A side collision determination apparatus for a vehicle includes: a first acceleration sensor and a second acceleration sensor mounted on each side surface of the vehicle; and a determination unit configured to perform determination whether a level of collision, which has occurred at apart of the side surface, is equal to or higher than a prescribed level. The determination unit performs the determination based on the acceleration detected by a non-collision side one of the first and second acceleration sensors when the part of the side surface at which the collision has been occurred is adjacent to the sensor-mounted position. The determination unit performs the determination based on the acceleration detected by a collision side one of the first and second acceleration sensors when the part of the side surface at which the collision has been occurred is apart from the sensor-mounted position.

8 Claims, 5 Drawing Sheets

(56) References Cited

U.S. PATENT DOCUMENTS

| | | | |
|---|---|---|---|
| 7,516,004 B2 * | 4/2009 | Kawasoe et al. | 701/45 |
| 7,556,119 B2 * | 7/2009 | Takehara et al. | 180/274 |
| 8,155,842 B2 * | 4/2012 | Ueno | 701/45 |
| 2004/0032322 A1 * | 2/2004 | Kocher et al. | 340/436 |
| 2004/0050610 A1 * | 3/2004 | Kawasoe et al. | 180/282 |
| 2005/0107933 A1 * | 5/2005 | Kuroda et al. | 701/45 |
| 2007/0000711 A1 * | 1/2007 | Yamaguchi et al. | 180/274 |
| 2008/0046148 A1 * | 2/2008 | Hayashi et al. | 701/45 |

FOREIGN PATENT DOCUMENTS

| | | |
|---|---|---|
| EP | 2 045 144 A1 | 4/2009 |
| JP | 2007-118797 A | 5/2007 |
| JP | 2008-137491 A | 6/2008 |
| JP | 2009-90816 A | 4/2009 |
| JP | 2009-101837 A | 5/2009 |

* cited by examiner

SIDE COLLISION DETERMINATION APPARATUS FOR VEHICLE AND HIGH VOLTAGE POWER SUPPLY SHUT-OFF APPARATUS

BACKGROUND OF THE INVENTION

1. Field of the Invention

The invention relates to a side collision determination apparatus for a vehicle which determines whether a colliding object has collided with a side surface of a vehicle and a high voltage power supply shut-off apparatus which determines that a colliding object has collided with a side surface of an electric vehicle and thus shuts off power supply to a high voltage part of a high voltage power supply.

2. Description of the Related Art

Regarding a side collision of a vehicle, there is a related art which determines the side collision using acceleration sensors mounted to a side surface of the vehicle and deploys a safety apparatus such as an airbag.

In many cases, the acceleration sensors are mounted to B pillars that are columns supporting a roof of the vehicle and are positioned at centers of side surfaces. The related art suggest detecting a distance to the colliding object or provide other sensors such as a deformation sensor, a pressure sensor and the like (for example, Patent Documents 1 to 3).

An electric vehicle is provided with a high voltage power supply for driving a motor. When the vehicle body is damaged due to the collision, a part relating to the high voltage, a safety belt and the like may be damaged. In order to prevent an occupant or helper from contacting the damaged part or harness or to prevent another part from being damaged, the high voltage power supply is shut off when the collision is detected (for example, Patent Document 4). The shut-off operation of the high voltage power supply may be performed on the basis of information of the acceleration sensors for the safety apparatus such as an airbag and the like.

[Patent Document 1] JP-A-2008-137491
[Patent Document 2] JP-A-2009-90816
[Patent Document 3] JP-A-2009-101837
[Patent Document 4] JP-A-2007-118797

When a collision, which is a trigger for shutting off the high voltage, is a side collision, it is necessary to detect all of collisions from the front to the most rearward of the side surface of the vehicle. Regarding the side collisions of the front and the center of the side surface, it is considered to detect the collisions with the acceleration sensors and the like for the airbag, which are mounted to the B pillars, and to thus shut off the high voltage.

However, when an object collides with a part of the vehicle adjacent to the B pillar, a part of the vehicle body neighboring to the acceleration sensor is damaged, so that the acceleration sensor or harness may be damaged. As a result, a direction of a sensitive axis of the sensor is changed, so that it is not possible to accurately detect the acceleration occurring in the vehicle body.

In addition, when the side collision occurs at the most rearward part of the side surface, the vehicle body is rotated since a center of the vehicle is apart from the collision position. As a result, it may be difficult to detect the collision using the acceleration sensors mounted to the B pillars and the like. To solve the problem, it is necessary to mount a separate acceleration sensor at the rear part of the side surface. However, a space for mounting the sensor should be secured and the cost is increased.

SUMMARY OF THE INVENTION

It is therefore an object of the invention to provide a side collision determination apparatus for a vehicle which is advantageous to certainly detect a side collision of the vehicle while effectively using an interior space of the vehicle and reducing the cost and to provide a high voltage power supply shut-off apparatus which is advantageous to certainly shut off a high voltage power supply when a side collision of the vehicle occurs while effectively using an interior space of the vehicle and reducing the cost.

In order to achieve the object, according to the invention, there is provided a side collision determination apparatus for a vehicle that includes a side surface including a right side surface and a left side surface, the side collision determination apparatus comprising: a first acceleration sensor and a second acceleration sensor each of which is mounted on a sensor-mounted position of each side surface and each of which is configured to detect acceleration; and a determination unit which is configured to perform determination whether a level of collision, which has occurred at a part of the side surface, is equal to or higher than a prescribed level, the determination unit which performs the determination based on the acceleration detected by a non-collision side one of the first and second acceleration sensors when the part of the side surface at which the collision has been occurred is adjacent to the sensor-mounted position, the determination unit which performs the determination based on the acceleration detected by a collision side one of the first and second acceleration sensors when the part of the side surface at which the collision has been occurred is apart from the sensor-mounted position.

The side collision determination apparatus may further include a storage unit which is configured to store a threshold preset correspondingly to the first acceleration sensor and the second acceleration sensor. The determination unit may perform the determination based on comparison results of the acceleration detected by the first and second acceleration sensors and the threshold.

The threshold may include a first value, and when one of the first and second acceleration sensors detects acceleration being greater than the first value, the determination unit determines that the part of the side surface at which the collision has been occurred is adjacent to the sensor-mounted position of the other of the first and second acceleration sensors and performs the determination based on the acceleration detected by the one of the first and second acceleration sensors.

The threshold may include a second value being smaller than the first value, and when one of the first and second acceleration sensors detects acceleration being greater than the second value and smaller than first value, the determination unit determines that the part of the side surface at which the collision has been occurred is apart from the sensor-mounted position of the other of the first and second acceleration sensors and performs the determination based on the acceleration detected by the one of the first and second acceleration sensors.

The threshold may be acceleration of the first acceleration sensor or acceleration of the second acceleration sensor, which is previously obtained by performing a collision test of a minimum level with which it should be determined that collision has occurred at the side surface.

The threshold may be acceleration of the first acceleration sensor or acceleration of the second acceleration sensor, which is previously obtained by performing a collision test of a maximum level with which it should not be determined that collision has occurred at the side surface.

The first acceleration sensor and the second acceleration sensor may be mounted on one of B pillars, side sills and a floor of the vehicle.

The first acceleration sensor and the second acceleration sensor may be acceleration sensors that are used for safety apparatuses including airbags.

According to the invention, there is also provided a high voltage power supply shut-off apparatus comprising: the side collision determination apparatus; and a high voltage power supply control unit that shuts off power supply to a high voltage part of a high voltage power supply when the determination unit determines that the level of collision is equal to or higher than the prescribed level.

DETAILED DESCRIPTION OF THE INVENTION

Figure 1:
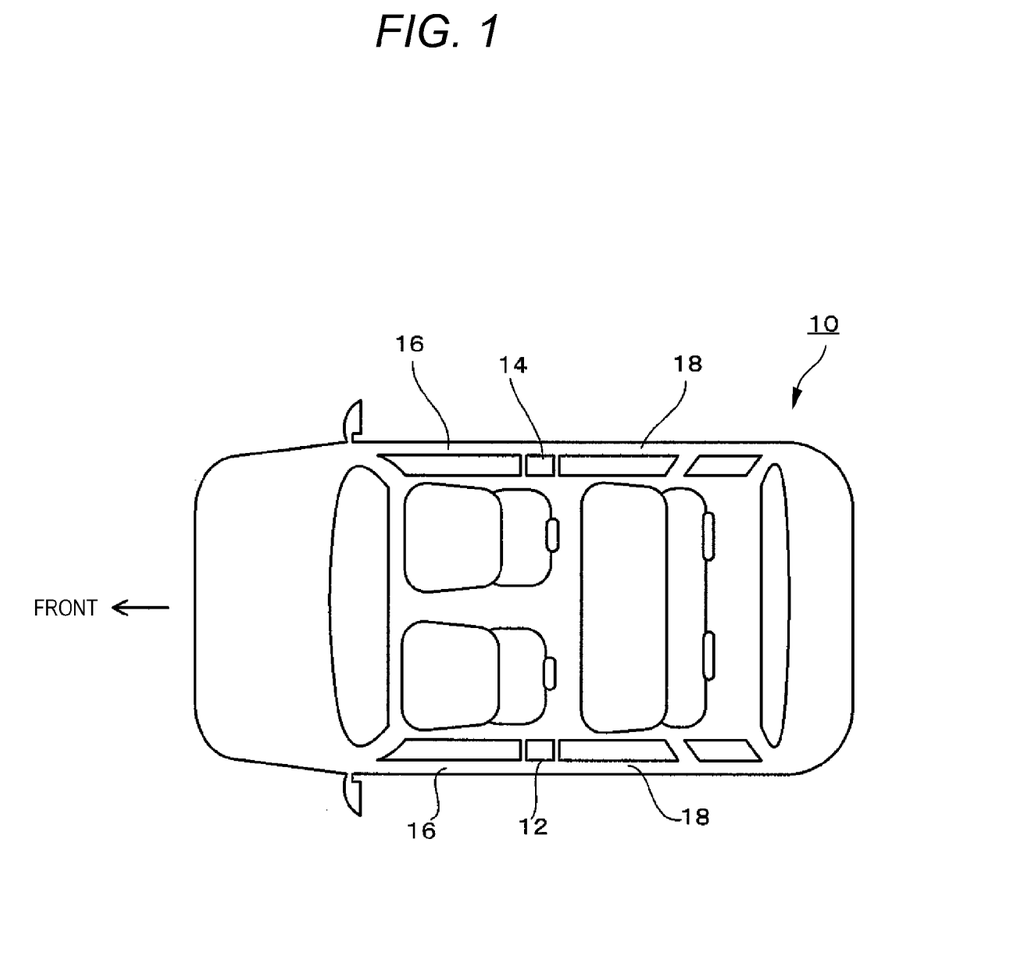
FIG. 1 is a plan view showing an example of arrangement of acceleration sensors that are used for a side collision determination apparatus for a vehicle according to an embodiment of the invention.
Figure 2:
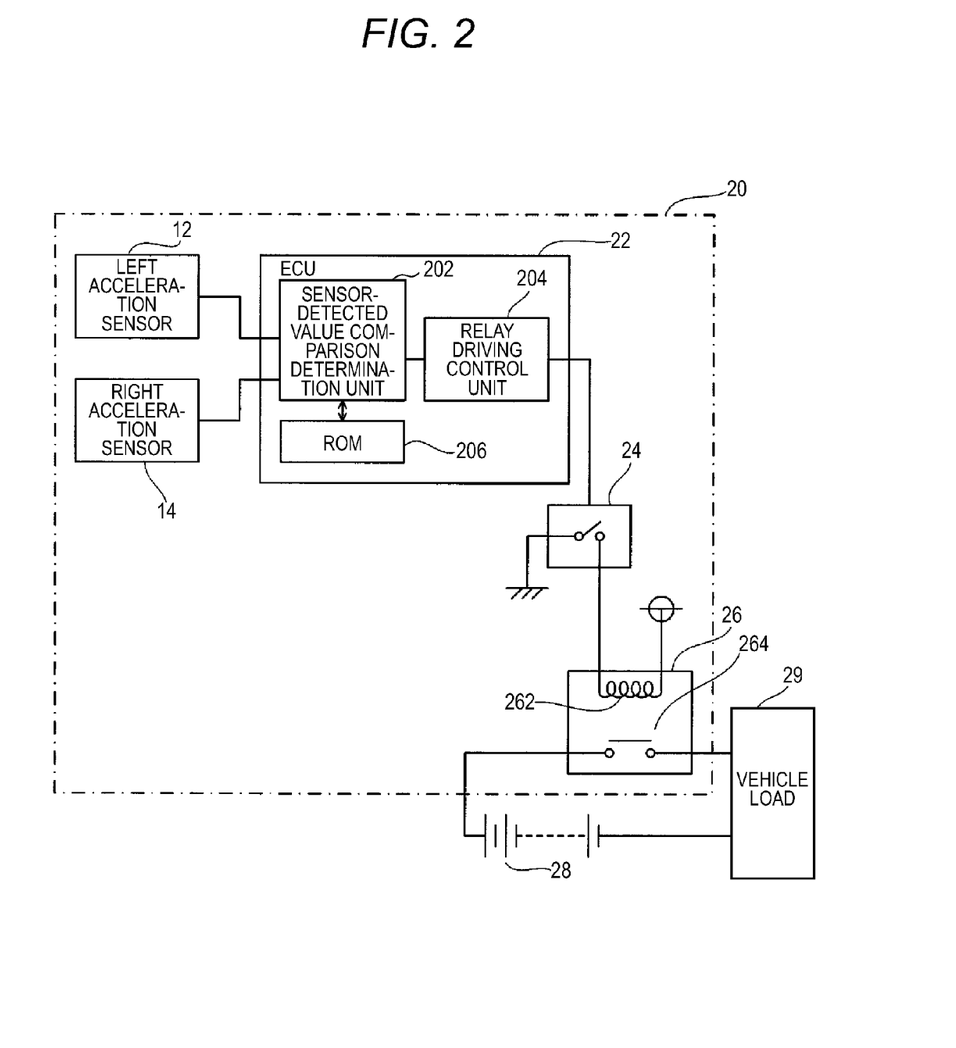
FIG. 2 is a functional block diagram showing a structure of a high voltage power supply shut-off apparatus according to an embodiment of the invention.

Hereinafter, an embodiment of the present invention will be specifically described with reference to the drawings. As shown in FIG. 1, in this embodiment, a vehicle 10 in which a side collision determination apparatus and a high voltage power supply shut-off apparatus are mounted is a vehicle having a high voltage power supply (for example, an electric vehicle and a hybrid vehicle). As shown in FIG. 2, the vehicle 10 includes a high voltage power supply 28 that includes a battery and a vehicle load 29 that operates with a high voltage, in addition to a high voltage power supply shut-off apparatus 20.

The high voltage power supply shut-off apparatus 20 includes left and right acceleration sensors 12, 14, an ECU (Electronic Control Unit) 22, a switch 24 and a main relay 26. The high voltage power supply shut-off apparatus 20 shuts off power supply to the vehicle load 29 from the high voltage power supply 28, based on detected acceleration supplied from the left and right acceleration sensors 12, 14 when a collision, a level of which is equal to or higher than a prescribed level, has occurred at the vehicle 10.

As shown in FIG. 1, the left acceleration sensor 12 is mounted on a left side surface of the vehicle 10 and the right acceleration sensor 14 is mounted on a right side surface of the vehicle 10. The left and right acceleration sensors 12, 14 are respectively mounted on positions of the vehicle body having high rigidity. The left and right acceleration sensors 12, 14 detect acceleration of side parts of the vehicle 10, which is caused due to the impact applied to the vehicle 10, and output the detected acceleration. In the embodiment, the left and right acceleration sensors 12, 14 are respectively mounted on left and right B pillars between front seat doors 16 and rear seat doors 18. In other words, the left and right acceleration sensors 12, 14 are mounted on approximate center parts of the front-rear direction of the left and right side surfaces of the vehicle 10. The positions on which the left and right acceleration sensors 12, 14 are mounted are not limited to the B pillars. For example, the sensors may be mounted on the other positions such as side sills, a floor and the like. In addition, as the left and right acceleration sensors 12, 14, acceleration sensors used for the safety apparatuses such as airbags may be used. Alternatively, the left and right acceleration sensors 12, 14 may be independently provided. When the acceleration sensors used for the safety apparatuses are used as the left and right acceleration sensors 12, 14, it is advantageous to reduce the cost because it is not necessary to separately provide a dedicated acceleration sensor.

The ECU 22 is a micro computer to which a CPU, a ROM for storing programs in which a control program and the like are stored, a RAM that provides working areas, an interface unit interfacing with peripheral circuits and the like, all of which are not shown, are connected through buses. The ECU 22 operates as the CPU executes the control program. In the embodiment, the ECU 22 includes a sensor-detected value comparison determination unit 202, a relay driving control unit 204 and a ROM 206. As the CPU executes the control program, the sensor-detected value comparison determination unit 202 and the relay driving control unit 204 are implemented. Meanwhile, in the embodiment, the operations of the sensor-detected value comparison determination unit 202 and the relay driving control unit 204 are implemented with the single ECU. However, it may be possible that the sensor-detected value comparison determination unit 202 and the relay driving control unit 204 are implemented by a separate ECU. The collision determination apparatus is configured by the left acceleration sensor 12, the right acceleration sensor 14 and the ECU 22. The sensor-detected value comparison determination unit 202 corresponds to a determination unit, and the ROM 206 corresponds to a storage unit.

The sensor-detected value comparison determination unit 202 is supplied with detection signals of the left acceleration sensor 12 and the right acceleration sensor 14. In the embodiment, the outputs of the left and right acceleration sensors 12, 14 are directly supplied to the sensor-detected value comparison determination unit 202 of the ECU 22. However, an integration process, a moving average process and the other processes may be performed by LPF and the like for the detected accelerations of the left and right acceleration sensors 12, 14, and then the processed accelerations may be supplied to the ECU 22. This is because such implementation is advantageous to avoid a malfunction caused due to an instant position variation and the like of the vehicle 10.

The sensor-detected value comparison determination unit 202 compares the detected accelerations supplied from the left and right acceleration sensors 12, 14 with threshold values of accelerations that are stored in the ROM 206 in advance and that are preset correspondingly to the left and right acceleration sensors 12, 14, determines whether a collision to be detected has occurred and supplies a determination signal to the relay driving control unit 204.

The relay driving control unit 204 generates a control signal for shutting off the high voltage power supply, based on the determination signal, and then outputs the control signal to the switch 24.

The switch 24 turns on/off current supply to the main relay 26, based on the control signal.

The main relay 26 includes an excitation coil 262 and a relay device 264. When the switch 24 is turned on, the current is supplied to the excitation coil 262. As the current flows in the coil, the excitation coil 262 is excited and the relay device 264 is turned on. Thereby, the power is supplied to the vehicle load 29 from the high voltage power supply 28. When the switch 24 is turned off, the current supply to the excitation coil 262 is stopped. Since the current does not flow in the excitation coil 262, the excitation coil 262 is not excited and the relay device 264 is turned off. Thereby, the power supply to the vehicle load 29 from the high voltage power supply 28 is shut off. Accordingly, in the embodiment, the relay driving control unit 204, the switch 25 and the main relay 26 configure the high voltage power supply control unit.

Figure 3:
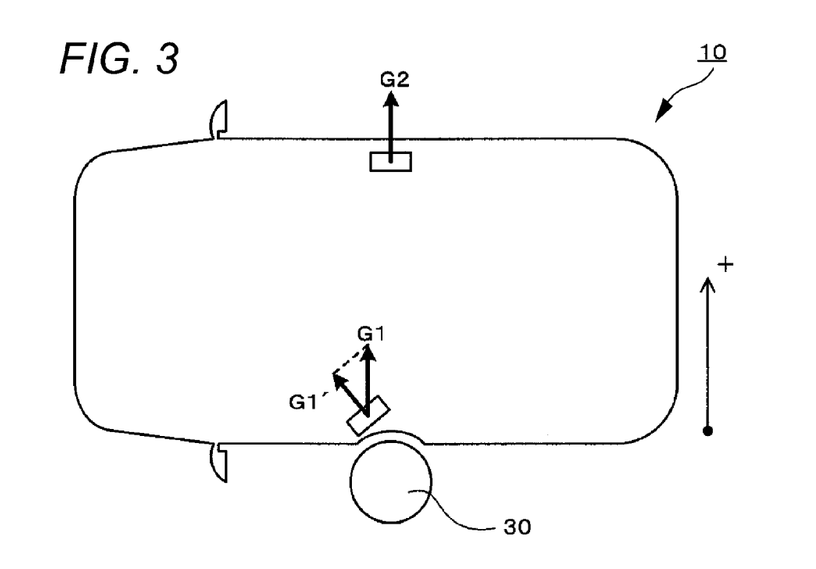
FIG. 3 illustrates operations of left and right acceleration sensors when a collision occurs at a center part of a front-rear direction of a side surface of a vehicle.
Figure 4:
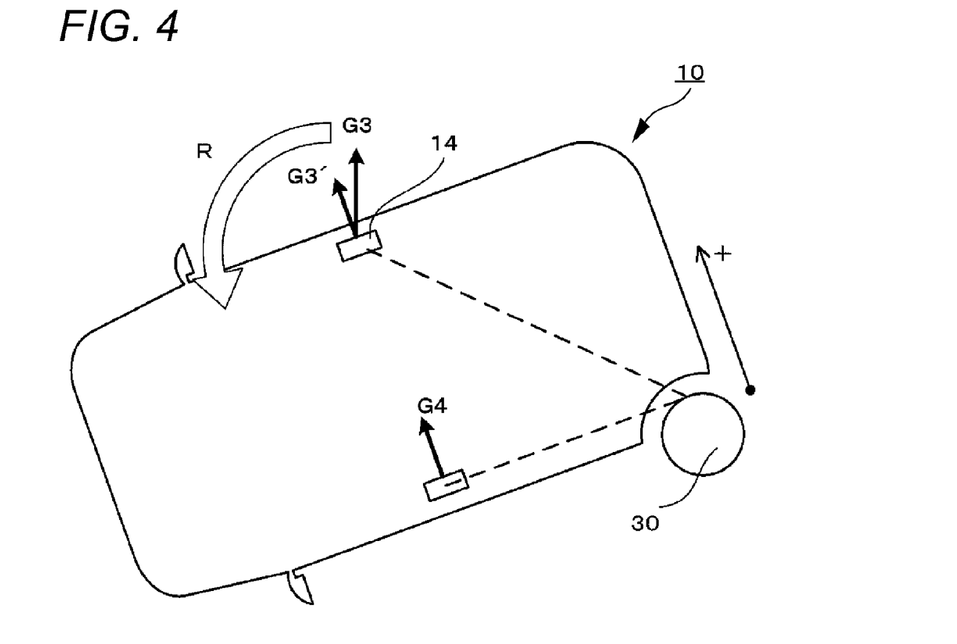
FIG. 4 illustrates operations of left and right acceleration sensors when a collision occurs at a rear of a side surface of a vehicle.

Next, the operations of the left and right acceleration sensors 12, 14 in response to positions at which a collision occurs with respect to the vehicle 10 will be described with reference to FIGS. 3 and 4. FIGS. 3 and 4 show cases where a colliding object 30 has collided with the vehicle 10. In the embodiment, a rightward acceleration of the vehicle 10 is referred to as a positive acceleration that is detected by the acceleration sensors 12, 14 and a leftward acceleration of the vehicle 10 is referred to as a negative acceleration that is detected by the acceleration sensors 12, 14. In other words, when the colliding object 30 collides with a left side of the vehicle 10, acceleration detected by the acceleration sensors 12, 14 indicates a positive value. In addition, when the colliding object 30 collides with a right side of the vehicle 10, acceleration detected by the acceleration sensors 12, 14 indicates a negative value. Accordingly, based on the positive or negative value of the acceleration detected by the acceleration sensors 12, 14, it is possible to determine at which side of the left and right sides of the vehicle 10 the collision has occurred.

Based on comparison result of the accelerations detected by the left and right acceleration sensors 12, 14 and preset first to fourth threshold values Th1, Th2, Th3, Th4, which will be described later, it is determined whether a collision of a prescribed level or higher has occurred.

As shown in FIG. 3, when the colliding object 30 collides with a part of the left side surface, which is adjacent to a sensor-mounted position on which the left acceleration sensor 12 is mounted, of the left side surface of the vehicle 10, a direction of a sensitive axis of the left acceleration sensor 12 may be changed due to deformation of the vehicle body. Like this, when the direction of the sensitive axis of the left acceleration sensor 12 is changed, an absolute value of detected acceleration G1' is detected as a value that is smaller than an absolute value of actual acceleration G1 of the collision.

Regarding this, it is thought that the right acceleration sensor 14 mounted on the right side surface that is a non-collision side of the vehicle 10 can accurately detect the acceleration without a change of a direction of a sensitive axis thereof. Accordingly, when the colliding object 30 collides with the part adjacent to the sensor-mounted position of the left side surface, the acceleration detected by the right acceleration sensor 14 is compared with a first threshold value Th1 which is set in advance. When the acceleration detected by the right acceleration sensor 14 is higher than the first threshold value Th1, it is determined that the collision has occurred at the left side surface. Here, the first threshold value Th1 is greater than zero (Th1>0). In the meantime, the first threshold value Th1 is obtained as acceleration that the right acceleration sensor 14 detects with respect to a collision of a minimum level with which it should be determined that a collision has occurred by carrying out a collision test on the part adjacent to the sensor-mounted position of the left side surface. In other words, the first threshold value Th1 is a positive acceleration that the right acceleration sensor 14 detects when a collision of a minimum level, with which a collision is to be determined, has occurred at the part adjacent to the sensor-mounted position of the left side surface of the vehicle 10.

Next, when the colliding object 30 collides with a part of the right side surface, which is adjacent to a sensor-mounted position on which the right acceleration sensor 14 is mounted, of the right side surface of the vehicle 10, it is the same as the above case where the colliding object 30 collides with the part adjacent to the sensor-mounted position of the left side surface. When the colliding object 30 collides with the part adjacent to the sensor-mounted position of the right side surface of the vehicle 10, there is a possibility that an absolute value of the acceleration detected by the right acceleration sensor 14 of the collision side will be detected as a value that is smaller than an absolute value of the actual acceleration. Therefore, the acceleration (<0) detected by the left acceleration sensor 12 is compared with a second threshold value Th2 (<0).

When the acceleration detected by the left acceleration sensor 12 is smaller than the second threshold value Th2, it is determined that the collision has occurred at the right side surface. In the mean time, the second threshold value Th2 is obtained as acceleration that the left acceleration sensor 12 detects with respect to a collision of a minimum level with which it should be determined that a collision has occurred by carrying out a collision test on the part adjacent to the sensor-mounted position of the right side surface. In other words, the second threshold value Th2 is a negative acceleration that the left acceleration sensor 12 detects when a collision of a minimum level, with which a collision is to be determined, has occurred at the part adjacent to the sensor-mounted position of the right side surface of the vehicle 10.

Next, as shown in FIG. 4, when the colliding object 30 collides with a part (collided part) of the left side surface, which is adjacent to a rearward part of the left side surface of the vehicle 10, a position of the collided part is apart from the center (gravity center) of the vehicle 10. Thus, the vehicle 10 is rotated about the position of the collided part serving as a fulcrum. As the vehicle 10 is rotated, the position on which the right acceleration sensor 14 is mounted is rotated in an R direction shown in FIG. 4. Due to the rotation, the direction of the sensitive axis of the right acceleration sensor 14 is deviated from the collision direction. Thus, an absolute value of acceleration G3' (>0) that is detected by the right acceleration sensor 14 is detected as a value that is smaller than an absolute value of actual acceleration G3. Although the acceleration G3 is mainly caused after deformation of the vehicle body due to the collision, the vehicle has started to rotate from the time point at which the acceleration has been still generated high, so that the detected acceleration G3' is smaller than the actual acceleration.

In the meantime, the position on which the left acceleration sensor 12 is mounted is also rotated in the R direction of FIG. 4. However, since the generation of high acceleration has ended at the time point at which the vehicle body starts to rotate, the acceleration G4 is little affected by the rotation of the vehicle body, in comparison with the acceleration G3.

Accordingly, when the collision occurs at the rearward part of the left side surface of the vehicle 10, a value of the acceleration detected by the left acceleration sensor 12 is compared with a third threshold value Th3 which is set in advance. When the value of the acceleration detected by the left acceleration sensor 12 is greater than the third threshold value Th3, it is determined that the collision has occurred at the left side surface. Here, the third threshold value Th3 is greater than zero (Th3>0). In the meantime, the third threshold value Th3 is obtained as acceleration that the left acceleration sensor 12 detects with respect to a collision of a minimum level with which it should be determined that a collision has occurred by carrying out a collision test on the rearward part of the left side surface. In other words, the third threshold value Th3 is a positive acceleration that the left acceleration sensor 12 detects when a collision of a minimum level, with which a collision is to be determined, has occurred at the rearward part of the left side surface of the vehicle 10.

Next, when the colliding object 30 collides with the right side surface of the vehicle 10, it is the same as the above case where the colliding object 30 collides with the left side surface. When the collision occurs at the rearward part of the right side surface of the vehicle 10, it is thought that the acceleration detected by the right acceleration sensor 14 of the collision side indicates a value (<0) closer to a value of the actual acceleration than a value of the acceleration detected by the left acceleration sensor 12. Accordingly, a value of the acceleration detected by the right acceleration sensor 14 is compared with a fourth threshold value Th4 (<0), which is set in advance. When the value of the acceleration detected by the right acceleration sensor 14 is smaller than the fourth threshold value Th4, it is determined that the collision has occurred at the right side surface. In the meantime, the fourth threshold value Th4 is obtained as acceleration that the right acceleration sensor 14 detects with respect to a collision of a minimum level with which it should be determined that a collision has occurred by carrying out a collision test on the rearward part of the right side surface. In other words, the fourth threshold value Th4 is a negative acceleration that the right acceleration sensor 14 detects when a collision of a minimum level, with which a collision is to be determined, has occurred at the rearward part of the right side surface of the vehicle 10.

Here, since the absolute values of the detected accelerations with which it should be determined that the collision has occurred at the left and right side surfaces of the vehicle 10 are typically same, the absolute values of the first and second threshold values Th1, Th2 are equal to each other and the absolute values of the third and fourth threshold values Th3, Th4 are equal to each other. In other words, Th1=−Th2 and Th3=−Th4. However, since the determination may be different depending on the rigidity or the position of the high voltage part, it may be possible that Th1≠−Th2 and Th3≠−Th4. In addition, the absolute values of the first and second threshold values Th1, Th2 are greater than the absolute values of the third and fourth threshold values Th3, Th4.

The ECU 22 compares the first to fourth threshold values Th1, Th2, Th3, Th4 with the respective detected accelerations. A sequence thereof will be specifically described using a flowchart of FIG. 5.

Figure 5:
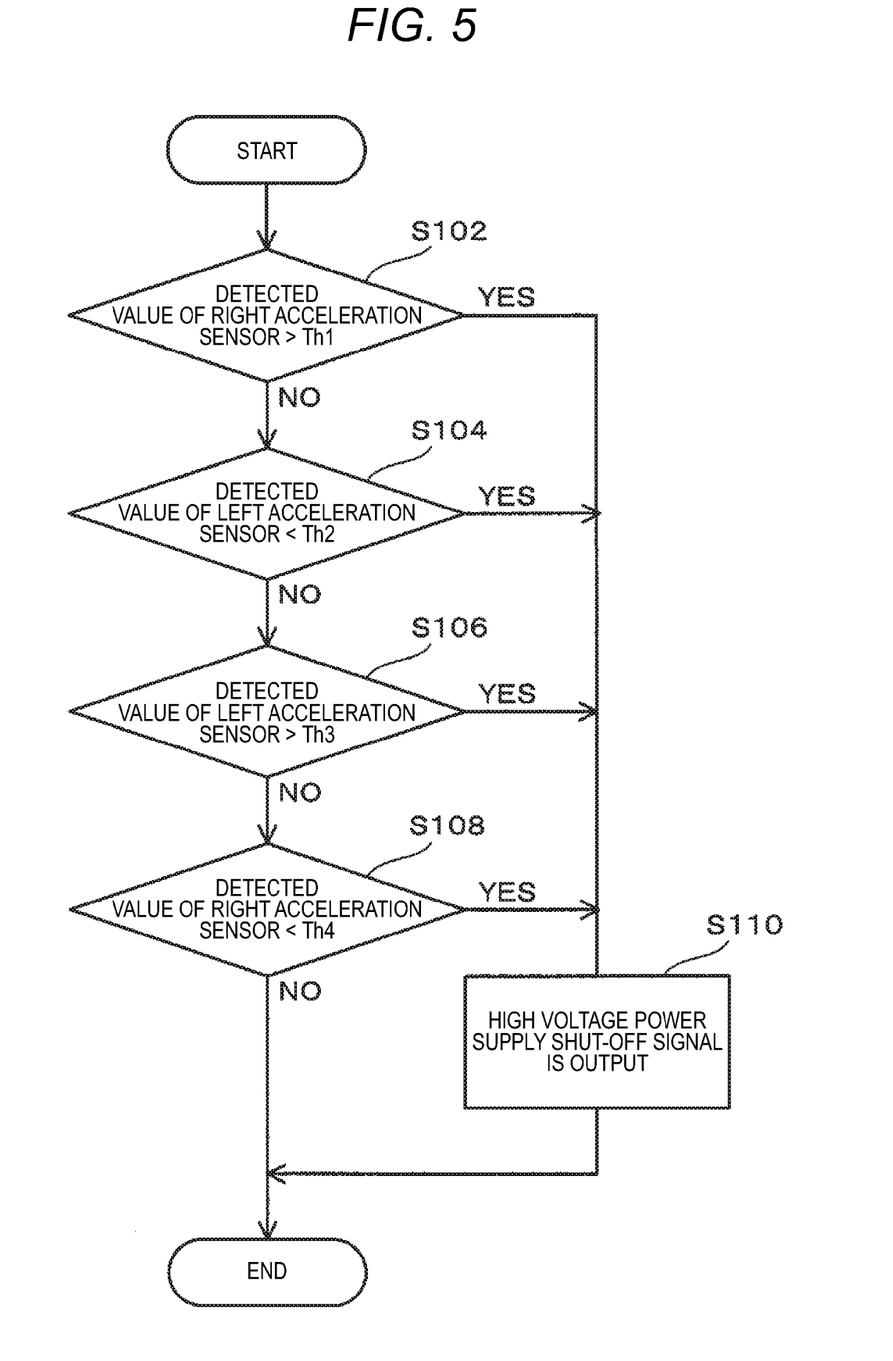
FIG. 5 is a flow chart showing a sequence in which a high voltage power supply shut-off apparatus according to an embodiment of the invention generates a high voltage power supply shut-off signal.

First, the ECU 22 compares the acceleration detected by the right acceleration sensor 14 with the first threshold value Th1 so as to detect a collision at the center part of the front-rear direction of the left side surface of the vehicle 10 (S102). When it is determined that the acceleration detected by the right acceleration sensor 14 is higher than the first threshold value Th1, the ECU determines that a collision has occurred and outputs a high voltage power supply shut-off signal (S110). When the acceleration detected by the right acceleration sensor 14 is equal to or smaller than the first threshold value Th1, the sequence proceeds to step S104.

In step S104, the ECU 22 compares the acceleration detected by the left acceleration sensor 12 with the second threshold value Th2 so as to detect a collision at the center part of the front-rear direction of the right side surface of the vehicle 10 (S104). When the acceleration detected by the left acceleration sensor 12 is smaller than the second threshold value Th2, the sequence proceeds to step S110 and a high voltage power supply shut-off signal is output. When the acceleration detected by the left acceleration sensor 12 is equal to or greater than the second threshold value Th2, the sequence proceeds to step S106. In step S106, the ECU 22 compares the acceleration detected by the left acceleration sensor 12 with the third threshold value Th3 so as to detect a collision at the rearward part of the left side surface of the vehicle 10 (S106). When the acceleration detected by the left acceleration sensor 12 is greater than the third threshold value Th3, the sequence proceeds to step S110 and a high voltage power supply shut-off signal is output. When the acceleration detected by the left acceleration sensor 14 is equal to or smaller than the third threshold value Th3, the sequence proceeds to step S108. In step S108, the ECU 22 compares the acceleration detected by the right acceleration sensor 14 with the fourth threshold value Th4 so as to detect a collision at the rearward part of the right side surface of the vehicle 10 (S108). When the acceleration detected by the right acceleration sensor 14 is smaller than the third threshold value Th4, the sequence proceeds to step S110 and a high voltage power supply shut-off signal is output. In other words, when it is determined by the sensor-detected value comparison determination unit 202 that any one of conditions of steps S102 to S108 is satisfied, it is determined that a collision of a prescribed level or higher has occurred at any one of the left and right side surfaces of the vehicle 10, the sequence proceeds to step S112 and a high voltage power supply shut-off signal is output. In addition, when it is determined by the sensor-detected value comparison determination unit 202 that all conditions of steps S102 to S108 are not satisfied, it is determined that a collision of a prescribed level or higher has not occurred at the side surfaces and the process is ended.

Accordingly, the sensor-detected value comparison determination unit 202 determines whether a collision of a prescribed level or higher has occurred at the side surface of the vehicle, as follows. The selection of the left and right acceleration sensors 12, 14 is made in such a way that when a collision has occurred at the part adjacent to the position on which anyone of the left and right acceleration sensors 12, 14 is mounted, the acceleration sensor mounted on the non-collision side is selected. In addition, the selection of the left and right acceleration sensors 12, 14 is made in such a way that when a collision has occurred at the rearward part of the side surface and the left and right acceleration sensors 12, 14 are mounted at the positions apart from the part at which the collision has occurred, the acceleration sensor mounted on the collision side is selected. The selection of the acceleration sensors is made on the basis of the comparison results of the acceleration detected by the right acceleration sensor 14 and the first and fourth threshold values Th1, Th4 and the comparison results of the acceleration detected by the left acceleration sensor 12 and the second and third threshold values Th2, Th3.

Next, modified embodiments will be described. The sensor-detected value comparison determination unit 202 may be configured by a collision determination circuit 40 shown in FIG. 6. The collision determination circuit 40 includes first to fourth comparators 42, 44, 46, 48 and first, second and third OR circuits 50, 52, 54.

Figure 6:
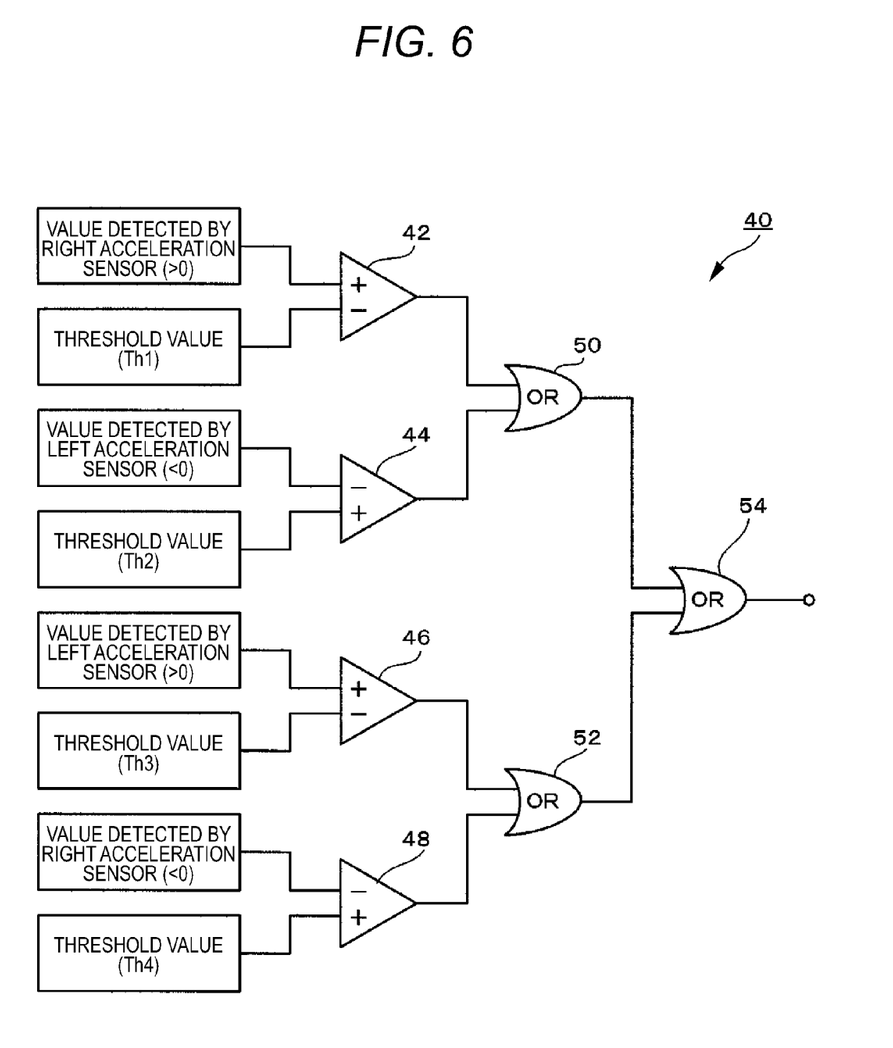
FIG. 6 is a schematic view of a determination circuit of a side collision determination apparatus for a vehicle according to an embodiment of the invention.

When the acceleration (>0) detected by the right acceleration sensor 14 is greater than the first threshold value Th1, i.e., a collision exceeding a prescribed value has occurred at the center part of the front-rear direction of the left side surface of the vehicle 10, an output of the first comparator 42 becomes an "H" level. In addition, when the acceleration (<0) detected by the left acceleration sensor 12 is smaller than the second threshold value Th2, i.e., a collision exceeding a prescribed value has occurred at the center part of the front-rear direction of the right side surface of the vehicle 10, an output of the second comparator 44 becomes an "H" level. Also, when the acceleration (>0) detected by the left acceleration sensor 12 is greater than the third threshold value Th3, i.e., a collision exceeding a prescribed value has occurred at the rearward part of the left side surface of the vehicle 10, an output of the third comparator 46 becomes an "H" level. Further, when the acceleration (<0) detected by the right acceleration sensor 14 is smaller than the fourth threshold value Th4, i.e., a collision exceeding a prescribed value has occurred at the rearward part of the right side surface of the vehicle 10, an output of the fourth comparator 48 becomes an "H" level.

The outputs of the first and second comparators 42, 44 are input to the first OR circuit 50 and the outputs of the third and fourth comparators 46, 48 are input to the second OR circuit 52. Outputs of the first and second OR circuits 50, 52 are input to the third OR circuit 54 and an output of the third OR circuit 54 is output as a determination result of the collision determination circuit 40. In other words, when any one of the outputs of the first to fourth comparators 42, 44, 46, 48 becomes an "H" level, an output of the collision determination circuit 40 becomes an "H" level. When an output of the collision determination circuit 40 becomes an "H" level, the main relay 24 is turned off to shut off the power supply to the vehicle load 29 from the high voltage power supply 28.

As described above, according to an aspect of the invention, in the side collision determination apparatus, when the collision has occurred at the part of the side surface which is adjacent to the position on which any one of the left and right acceleration sensors 12, 14 is mounted, the acceleration sensor mounted on the non-collision side is selected, and when the collision has occurred at the rearward part of the side surface which is apart from the positions on which the left and right acceleration sensors 12, 14 are mounted, the acceleration sensor mounted on the collision side is selected. Then, it is determined whether or not the collision is occurred based on the acceleration detected by the selected acceleration sensor. Accordingly, since it is sufficient to mount only two acceleration sensors on the vehicle 10, it is advantageous to certainly detect the side collision of the vehicle while effectively using the interior space of the vehicle and reducing the cost. In addition, in the high voltage power supply shut-off apparatus 20, the high voltage power supply 28 is shut off when a collision is detected using the side collision determination apparatus. Accordingly, it is advantageous to certainly shut off a high voltage power supply when a side collision of the vehicle occurs while effectively using the interior space of the vehicle and reducing the cost.

In the meantime, the side collision determination apparatus for the vehicle of the invention is not applied to only the shutting off of the high voltage power supply 28. Namely, the invention is applied to any function necessary to detect a collision with a side and a front of a subject.

According to an aspect of the invention, in the side collision determination apparatus for the vehicle, when the collision with the side surface of the vehicle has occurred adjacent to the acceleration sensor, the acceleration sensor of the non-collision side, and when the collision has occurred at the rearward part of the side surface which is apart from the acceleration sensors, the acceleration sensor of the collision side is selected. Then, it is determined whether or not the collision is occurred based on the acceleration detected by the selected acceleration sensor. Accordingly, since it is sufficient to mount only two acceleration sensors on the vehicle, it is advantageous to certainly detect the side collision of the vehicle while effectively using the interior space of the vehicle and reducing the cost. According to an aspect of the invention, the high voltage power supply is shut off based on the collision that is detected using the side collision determination apparatus. Accordingly, it is advantageous to certainly shut off a high voltage power supply when a side collision of the vehicle occurs while effectively using the interior space of the vehicle and reducing the cost.

What is claimed is:

1. A side collision determination apparatus for a vehicle that includes side surfaces including a right side surface and a left side surface, the side collision determination apparatus comprising:

a first acceleration sensor mounted on a one of the right and left side surfaces, and a second acceleration sensor mounted on the other of the right and left side surfaces, each of the first and second acceleration sensors being configured to detect acceleration; and a determination unit configured to determine whether a collision has occurred adjacent to one of the first and second acceleration sensors by comparing an output from at least one of the first and second acceleration sensors with one or more threshold values, the determination unit configured to perform the determination based on the acceleration detected by one of the first and second acceleration sensors mounted on a non-collision side when the part of the side surface at which the collision has occurred is adjacent to a position where the one of the first and second acceleration sensors is mounted, and the determination unit configured to perform the determination based on the acceleration detected by the other of the first and second acceleration sensors mounted on a collision-side when the part of the side surface at which the collision has occurred is apart from the position where the one of the first and second acceleration sensors is mounted, wherein the one or more threshold values include a first value, and when one of the first and second acceleration sensors detects acceleration being greater than the first value, the determination unit determines that the part of the side surface at which the collision has been occurred is adjacent to the position where the other of the first and second acceleration sensors is mounted and performs the determination based on the acceleration detected by the one of the first and second acceleration sensors.

2. The side collision determination apparatus according to claim 1, further comprising:

a storage unit configured to store the one or more threshold values corresponding to the first acceleration sensor and the second acceleration sensor.

3. The side collision determination apparatus according to claim 2, wherein the one or more threshold values are previously obtained by performing a collision test of a minimum level with which it should be determined that collision has occurred at the side surface.

4. The side collision determination apparatus according to claim 2, wherein the one or more threshold values are previously obtained by performing a collision test of a maximum level with which it should not be determined that collision has occurred at the side surface.

5. The side collision determination apparatus according to claim 1, wherein the one or more threshold values include a second value being smaller than the first value, and when one of the first and second acceleration sensors detects acceleration being greater than the second value and smaller than first value, the determination unit determines that the part of the side surface at which the collision has occurred is apart from the position where the other of the first and second acceleration sensors is mounted and performs the determination based on the acceleration detected by the one of the first and second acceleration sensors.

6. The side collision determination apparatus according to claim 1, wherein the first acceleration sensor and the second acceleration sensor are mounted on one of B pillars, side sills and a floor of the vehicle.

7. The side collision determination apparatus according to claim 1, wherein the first acceleration sensor and the second acceleration sensor are used for safety apparatuses including airbags.

8. A high voltage power supply shut-off apparatus comprising:
- the side collision determination apparatus according to claim 1; and
- a high voltage power supply control unit that shuts off power supply to a high voltage part of a high voltage power supply when the determination unit determines that the level of collision is equal to or higher than the prescribed level.

* * * * *